(No Model.)

O. G. FARRINGTON.
PULP SCREEN CLEANER.

No. 432,024. Patented July 15, 1890.

Witnesses:
E. A. Goddin.
Frederick L. Emery.

Inventor.
Orin G. Farrington,
by Crosby & Gregory, Attys.

UNITED STATES PATENT OFFICE.

ORIN G. FARRINGTON, OF FRANKLIN FALLS, NEW HAMPSHIRE.

PULP-SCREEN CLEANER.

SPECIFICATION forming part of Letters Patent No. 432,024, dated July 15, 1890.

Application filed April 9, 1889. Serial No. 306,588. (No model.)

*To all whom it may concern:*

Be it known that I, ORIN G. FARRINGTON, of Franklin Falls, county of Merrimac, State of New Hampshire, have invented an Improvement in Pulp-Screen Clearers, of which the following description, in connection with the accompanying drawings, is a specification, like letters on the drawings representing like parts.

This invention relates to pulp-screens, and has for its object to provide a novel cleaner or scraper by which the surface of the screen is kept free from coarse pulp of such size as will not readily pass through the slits in the screen, my improved cleaner being simple in construction and efficient in operation.

In accordance with my invention a scraper, which may be made of iron, wood, or other suitable material, is made substantially as long as the pulp-screen, and is preferably secured to a yoke connected to the crank-pin of a crank on a shaft having bearings in arms preferably secured to or forming part of the vat provided with the pulp-screen. The vat is made inclined at one end and is provided at its sides with movable guides, below which the scraper is moved in contact with the pulp-screen during its forward movement—that is, during one-half the rotation of the crank— the said scraper being supported by the said guides as it is moved back toward the rear of the vat on the further rotation of the said crank.

My invention consists, essentially, in a vat and a pulp-screen located therein, combined with a scraper and a shaft to which the said scraper is connected, and with a pivoted guide having one end extended into the path of movement of the scraper, substantially as will be described.

Figure 1:
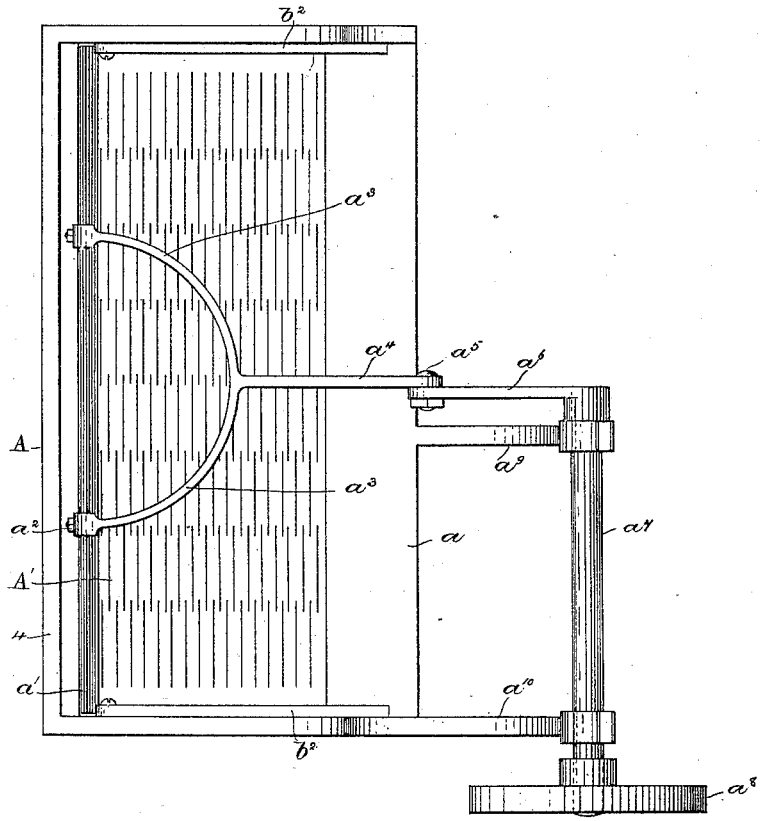
Figure 2:
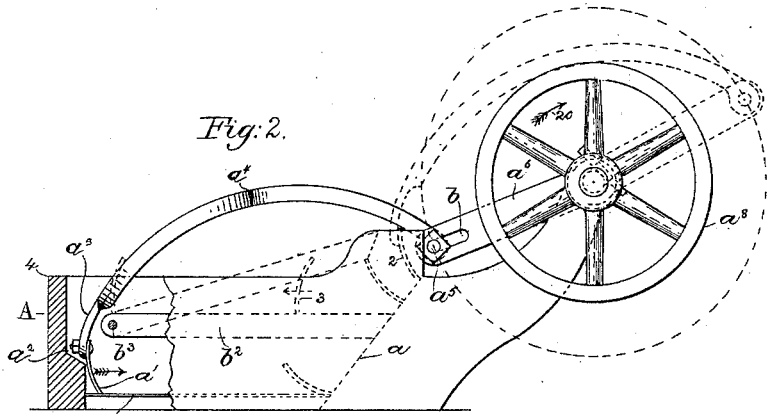

Figure 1 is a top or plan view of a vat provided with a pulp-screen and with my improved scraper. Fig. 2 is a section on the line $xx$, Fig. 1, the scraper being shown in two positions by full and dotted lines.

The vat A, provided with the pulp-screen A', of any usual or well-known construction such as now commonly used, has its rear side, as herein shown, made inclined, as at $a$. The vat A contains within it a scraper $a'$, extended substantially the length of the said vat, to act upon the entire surface of the pulp-screen. The scraper $a'$, which may be of iron, wood, or other suitable material, is secured, as herein shown, as by bolts $a^2$, to arms $a^3$ of a yoke $a^4$, connected by a pin $a^5$ to a crank $a^6$ on a shaft $a^7$, provided with the usual driving-pulley $a^8$, and supported, as herein shown, by arms $a^9$ $a^{10}$, secured to or forming part of the inclined side $a$. The crank $a^6$ is provided with a slot $b$, in which the pin $a^5$ slides when the said crank is revolved, the said slot permitting the scraper $a'$ to be kept in contact with the pulp-screen. As shown by full lines, Fig. 2, the scraper is in position to act upon the pulp-screen, and as the shaft is rotated in the direction of arrow 20, Fig. 2, the said scraper through the crank is moved forward across and in contact with the screen-plate toward the inclined side $a$, up which it is carried by the said crank, the said scraper, when in its highest position, being substantially flush with the top edge of the side $a$, so that the coarse pulp accumulated in front of the said scraper is discharged over the said inclined side. The scraper in its highest position, as indicated by dotted lines marked 2, Fig. 2, on the farther rotation of the shaft in the direction of the arrow 20, is moved backward and is brought in contact with pivoted guides $b^2$, preferably one at each side of the vat upon which the said scraper is supported, as indicated by dotted lines 3, Fig. 2. The guides or supports $b^2$ are herein shown as bars pivoted at their rear end, as at $b^3$, to the ends of the vat, the said guides having their free ends, as herein shown, resting upon the inclined side $a$ of the vat. The guides or supports $b^2$ are pivoted to the ends of the vat at a sufficient distance from the side marked 4 of the vat to permit of the passage of the scraper from above to below the said guides, as will be readily understood from Fig. 2. As the scraper passes up the inclined side $a$ on its forward movement it lifts the guides $b^2$, turning them on their pivots substantially into the position shown by dotted lines, Fig. 2, and after the said scraper has passed by the guides the latter fall by gravity, as herein shown, into their normal position in contact with the inclined side. It will be seen that on the backward movement of the scraper the latter is maintained out of contact with the pulp-screen and only acts upon the same on its movement in one direction.

I claim—

1. A vat and a pulp-screen located therein, combined with a scraper and a shaft to which the said scraper is connected, and with a pivoted guide having one end extended into the path of movement of the scraper, substantially as described.

2. A vat and a pulp-screen located therein, combined with a scraper and a shaft to which the said scraper is connected, and with guides pivoted to the sides of the said vat and having one end extended into the path of movement of the scraper, substantially as described.

In testimony whereof I have signed my name to this specification in the presence of two subscribing witnesses.

ORIN G. FARRINGTON.

Witnesses:
FRANK PROCTOR,
JOHN P. PROCTOR.